United States Patent
Humphreys et al.

(10) Patent No.: US 10,349,783 B2
(45) Date of Patent: Jul. 16, 2019

(54) FOOD PREPARATION APPARATUS

(71) Applicants: Abigail Humphreys, Big Lake, MN (US); Carla Humphreys, Big Lake, MN (US); Donald Humphreys, Big Lake, MN (US); Jazmin Humphreys, Big Lake, MN (US); John Humphreys, Big Lake, MN (US); Samantha Humphreys, Big Lake, MN (US)

(72) Inventors: Abigail Humphreys, Big Lake, MN (US); Carla Humphreys, Big Lake, MN (US); Donald Humphreys, Big Lake, MN (US); Jazmin Humphreys, Big Lake, MN (US); John Humphreys, Big Lake, MN (US); Samantha Humphreys, Big Lake, MN (US)

( * ) Notice: Subject to any disclaimer, the term of this patent is extended or adjusted under 35 U.S.C. 154(b) by 0 days.

(21) Appl. No.: 15/803,788

(22) Filed: Nov. 5, 2017

(65) Prior Publication Data

US 2018/0064291 A1 Mar. 8, 2018

Related U.S. Application Data

(63) Continuation-in-part of application No. 14/673,198, filed on Mar. 30, 2015, now abandoned.

(51) Int. Cl.
*A47J 47/00* (2006.01)
(52) U.S. Cl.
CPC .................................. *A47J 47/005* (2013.01)

(58) Field of Classification Search
CPC ..................................................... A47J 47/005
See application file for complete search history.

(56) References Cited

U.S. PATENT DOCUMENTS

| | | | | | |
|---|---|---|---|---|---|
| 3,505,031 | A | * | 4/1970 | Moore et al. | B01L 3/508 |
| | | | | | 177/262 |
| 5,203,548 | A | * | 4/1993 | Sanders | A47J 47/005 |
| | | | | | 269/289 R |
| 5,386,978 | A | * | 2/1995 | Ladwig | A47J 47/005 |
| | | | | | 269/289 R |
| 5,472,790 | A | * | 12/1995 | Thompson | A47J 47/005 |
| | | | | | 428/220 |
| 6,164,478 | A | * | 12/2000 | Cant | A47J 47/005 |
| | | | | | 220/6 |

OTHER PUBLICATIONS

Circumference Definition. Merriam-Webster Dictionary. https://www.merriam-webster.com/dictionary/circumference.*

* cited by examiner

*Primary Examiner* — Tyrone V Hall, Jr.
(74) *Attorney, Agent, or Firm* — Berggren Law Offices LLC; William R. Berggren

(57) ABSTRACT

The food processor apparatus comprises a spill-proof cutting surface and includes a cutting surface and a flexible flange attached to the cutting surface. The flexible flange is bendable and creates a raised rim around the cutting surface. The flexible flange is itself liquid-proof and is attached to the cutting surface in a liquid-proof manner.

17 Claims, 6 Drawing Sheets

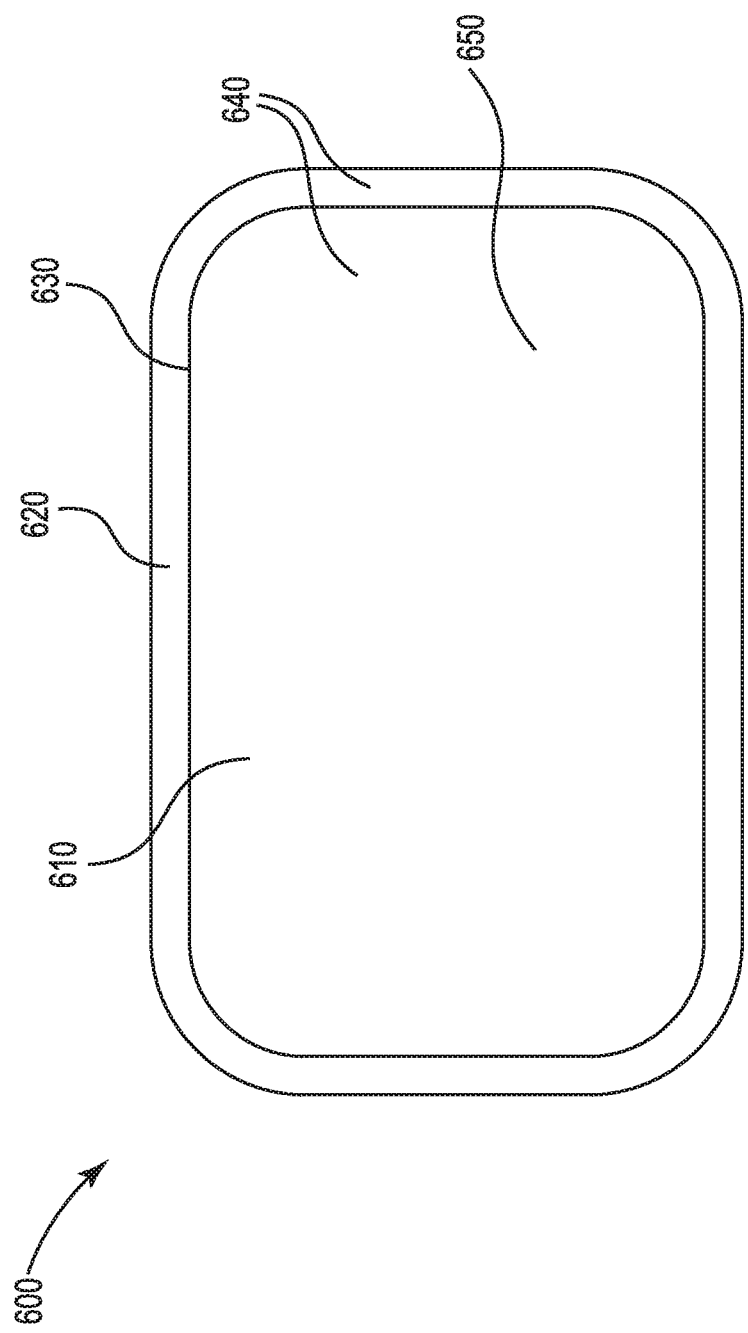

FOOD PREPARATION APPARATUS

RELATED APPLICATIONS

This application is a continuation-in-part of U.S. patent application Ser. No. 14/673,198 (currently pending) which was filed Mar. 30, 2015 and which is incorporated herein by reference in its entirety.

FIELD OF THE INVENTION

This application relates to the Culinary Arts, specifically to the cutting boards for food preparation.

BACKGROUND OF THE INVENTION

There is a need for a food preparation apparatus that has spill resistant cutting surface with flexible edges.

The provision of a food preparation apparatus that provides for liquid retention has been attempted in several ways. Provision of the rigid edge is exemplified by U.S. Pat. No. 7,300,103 (Grays) and U.S. Pat. No. 7,201,445 (Dubial et al.). In practice the rigid edges proved problematical for the user by inhibiting the use of a knife or other cutting instrument near the edges.

There is still a need for a spill resistant cutting surface with flexible edges.

SUMMARY OF THE INVENTION

The food preparation apparatus of this application is a spill resistant cutting surface with flexible edges suitable for germ-free sanitary processing of various food groups. Specifically, the food preparation apparatus comprises a substantially planar and a cutting surface and a flexible flange continuously affixed to the cutting surface. The cutting surface has a thickness, hardness, a shape, an area, an inner surface, and a continuous edge having no sharp changes in direction, and is flat, and substantially occupies plane. The flexible flange has a thickness, an outer edge, an inner edge with a circumference smaller than the circumference of the outer edge, and inner surface, and a length. The flexible flange is continuously affixed and attached to the cutting surface edge in a manner that contains liquid and solid debris. The flexible flange extends outward and upward from the plane of the cutting surface at an angle that permits the apparatus to be folded inward upon itself to form a trough able to allow liquid to be channeled in one direction. The material used for the food preparation apparatus can be configured to allow recovery of its original shapes when allowed to unfold. The inner surfaces of the cutting surface and the flexible flange combination has a contour that is uniform, continuous, and smooth with no corners to minimize the spread of germs.

The method of using the above described food preparation apparatus also is contemplated. A food preparation apparatus as described above is provided along with at least one piece of food to be prepared. The food is placed on the inner surface of the cutting surface of the food preparation apparatus. The food then can be cut into satisfactory form for subsequent use. The cut food can then be transferred to another apparatus such as, for example, a serving platter. Any liquid or solid waste debris resulting from the cutting can be directed into a disposal apparatus. Finally, the food preparation apparatus can be cleaned for reuse.

One embodiment of the invention is a spill-proof food cutting surface. Another embodiment of the invention is a flexible spill-proof cutting surface.

The food preparation apparatus permits preparing food that contains juices and or solid debris in a safe and less messy manner than possible with currently known food preparation apparatuses. The apparatus can be spill-proof. It also can be constructed to allow for easy removal of loose fluid and solid remains (debris) to another site, such as, for example, a sink, disposal, or waste basket through its ability to be bent into a trough or funnel. The one-piece smooth inner surface construction minimizes collection of germs and bacteria and permit easy and complete cleaning of the surface between preparation of different foods and final cleaning before storage. Also, the flexibility of the flange permits closer use of a cutting device to the food being prepared without risk of spilling the juices onto a counter or other surface upon which the food preparation apparatus is placed.

BRIEF DESCRIPTION OF THE DRAWINGS

One or more features or preferred forms of the invention are described in the accompanying drawings of embodiments of the invention. The drawings are described briefly below.

FIG. 6 is a top view of perspective view of an embodiment of the food preparation apparatus invention with a cutting surface having a rectangular shape with rounded corners.

Figure 1:
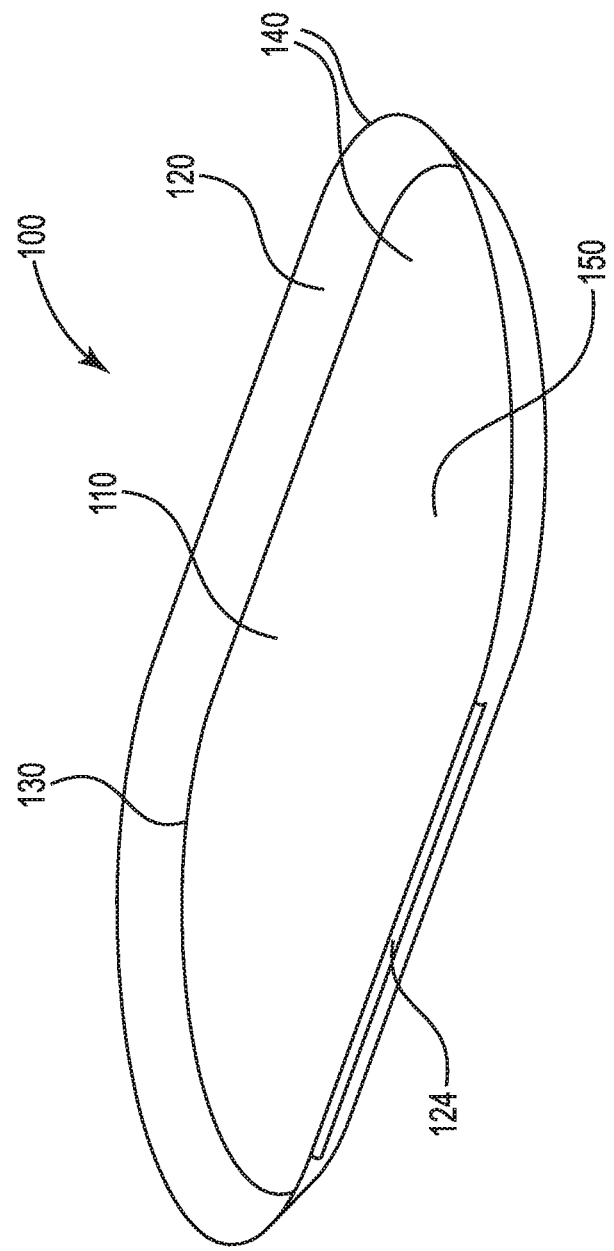
FIG. 1 is a perspective view of an embodiment of the food preparation apparatus invention with a cutting surface having an oblong shape with straight broad sides and semicircular narrow sides.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF SOME EMBODIMENTS OF THE INVENTION

There is a need for a food preparation apparatus that is simple, is resistant to germ collection, is easy to clean, prevents spilling of juices and solid debris onto the surrounding surfaces while preparing food items, and can be configured to permit easy disposal of the debris after the food is prepared. The invention allows the full use of the cutting surface area without the problems of spilling liquid and solid debris during food preparation. Other food preparation surfaces do not provide these advantages.

The invention is a food preparation apparatus that has a spill-proof cutting surface. The apparatus may be bent or folded into a funnel-liker form to channel the waste juices into a disposal receptacle. The apparatus then can be allowed to revert to its original shape after waste disposal when external force is removed. Specifically, the invention comprises a cutting surface and a flexible flange.

The cutting surface can have a thickness, hardness, a shape, an area, an inner surface, and a continuous edge having no sharp changes in direction, and can be flat, and can occupy a plane, for example, a horizontal plane. The cutting surface thickness can be thick enough and hard enough to prevent a carving knife from slicing through the cutting board surface while being used to cut a food item such as a roast or watermelon into smaller pieces. In addition, the thickness and hardness of the cutting surface may not prevent the cutting surface from bending under external force to form a funnel-like shape to allow juices and solid debris to be emptied into a waste container and reverting to its original shape when the force is removed. The shape of the cutting surface can range from a circle to an oval to an oblong shape with semicircular narrow ends, or a rectangle with rounded corners. The shape of the cutting surface can be sufficient to provide a satisfactory amount of food preparation area and to allow a funnel-like form to be formed with the flange under external force when bent to channel liquid and solid debris into a waste receptacle. The cutting surface can have an area that may be equivalent to a circle having a diameter of at least 6 in (15.2 cm) with an area of at least 28 in$^2$ (180 cm$^2$) to a square with a side of no more than 18 in (45 cm) with an area of no more than about 325 in$^2$ (2100 cm$^2$). Embodiments may have an area that may be at least 28 in$^2$ (180 cm$^2$), 40 in$^2$ (258 cm$^2$), 60 in$^2$ (387 cm$^2$), 80 in$^2$ (516 sq cm), or 100 sq in (645 sq cm) and no more than 325 sq in (2100 sq cm), 300 sq in (1935 cm$^2$), 260 in$^2$ (1680 cm$^2$), 225 in$^2$ (1450 cm$^2$), 200 in$^2$ (1290 cm$^2$) or 150 in$^2$ (970 cm$^2$). When the shape is a rectangle with rounded corners, the corners can be rounded enough to permit reversible folding of the apparatus to form a funnel-like form and not form regions where bacteria can collect. The corners can be rounded with at least an arc with a diameter of at least 0.5 in, (1.3 cm), 1.0 in (2.5 cm), 1.5 in (3.8 cm), 2.0 in (5.1 cm), 2.5 in (6.4 cm), or 3.0 in (7.7 cm).

The flexible flange can have a thickness, an outer edge, an inner edge with a circumference smaller than the circumference of the outer edge, an inner surface, and a length. The flexible flange is continuously affixed and attached to the cutting surface edge in a manner that contains liquid and solid debris. The flexible flange extends outward and upward from the plane of the cutting surface at an angle that permits the apparatus to be folded inward upon itself to form a trough able to allow liquid to be channeled in one direction. The thickness and length of the cutting surface is enough to permit the flexible flange to maintain an upward angled position relative to the plane of the cutting board surface on which it is affixed. This prevents undesired escape of juices during food preparation. It is also not enough to prevent the folding downward of a localized portion of the flange where the knife handle would be to a lesser amount above the plane of the cutting surface to permit the carving knife to achieve a better angle for cutting an item of food. The thickness, length, and angle above the plane of the cutting surface also are sufficient allow for the folding of the apparatus into a funnel-like form to channel waste liquid into a waste container. In some embodiments the length is at least 0.5 in (1.3 cm), 1.0 in, (2.5 cm), 1.5 in (3.8 cm), 2.0 in (5.1 cm), 2.5 in (6.4 cm), or 3.0 in (7.7 cm). In some embodiments the length is not greater than 4.0 in (10.5 cm), 3.5 in (8.9 cm), or 3.0 in (7.7 cm). In some embodiments the angle is at least 35 degrees (°) or at least 40°. In some embodiments the angle is not more than 55° or not more than 50°.

In some embodiments, at least a portion of the outer edge has an outward curve or bead. This minimizes abrasion of the edge against the hand or wrist of a person wielding a carving knife during food preparation. In some embodiments, the curved edge is on only a portion of the outer edge, such as the straight broader sides an embodiment having a shape of an oblong with semicircular narrow sides to increase flexibility of the flange to bend toward or into the plane of the cutting surface in an easy manner during food preparation and to fold easily into a funnel-like form during disposal of the liquid and or solid waste debris.

The material used to construct the food preparation apparatus is designed to allow at least the flexible flange to recover its original shape when released from an external force such as when folded into a funnel-like shape to dispose of liquid and solid debris. In some embodiments, the material used to construct the cutting surface also is designed to allow its surface to recover its original shape when allowed to unfold as well. In addition, the material used to construct the food preparation apparatus can block the passage of liquid and solid debris from passing onto surfaces surrounding the apparatus of the invention. This is generally flexible plastic such as, for example, polystyrene, polypropylene, low density polyethylene, high density polyethylene, and an acrylic—poly vinyl chloride alloy known as KYDEX® thermoplastic. Composites or metals such as, for example, aluminum, may not be suitable for the flexible flange if they were not capable of recovering their original shape when external force is removed. The material also can be dishwasher safe for easy maintenance of sanitary conditions.

In some embodiments, the flexible flange and the cutting surface can be made of a single piece of material. In some embodiments, the flexible flange is flexible enough to permit depression of the flange when a handle of a cutting implement is pressed on the flange permitting full access of the cutting implement to the cutting surface. polystyrene, polypropylene, low density polyethylene, high density polyethylene, and an acrylic—poly vinyl chloride alloy known as KYDEX® thermoplastic.

The combined inner surface of the cutting surface and the flexible flange can have a contour that is uniform, continuous, and smooth with no corners to minimize the spread of germs and bacteria. Where the flange and the cutting board surface are connected or affixed, no sharp right-angle edges are present. This allows for easy cleaning between uses to prevent collection of bacteria and cross contamination of food items.

A description of the invention is further explained by illustration of some specific embodiments. FIG. 1 is a perspective view of an embodiment of the food preparation apparatus invention with a cutting surface having an oblong shape with straight broad sides and semicircular narrow sides. A food preparation apparatus (100) is shown with a cutting board surface (110) shaped in an oblong with semicircular narrow ends, a flexible flange (120) continuously affixed to cutting surface 120 at cutting surface edge (130). The material (140) of cutting surface 110 and flexible flange 120 allows for the apparatus to be bent into a funnel-like shape under external force and revert to its original shape without the force. The inner surface (150) of the cutting surface and the flexible flange is smooth with no right angles for collection of germs and bacteria.

Figure 2:
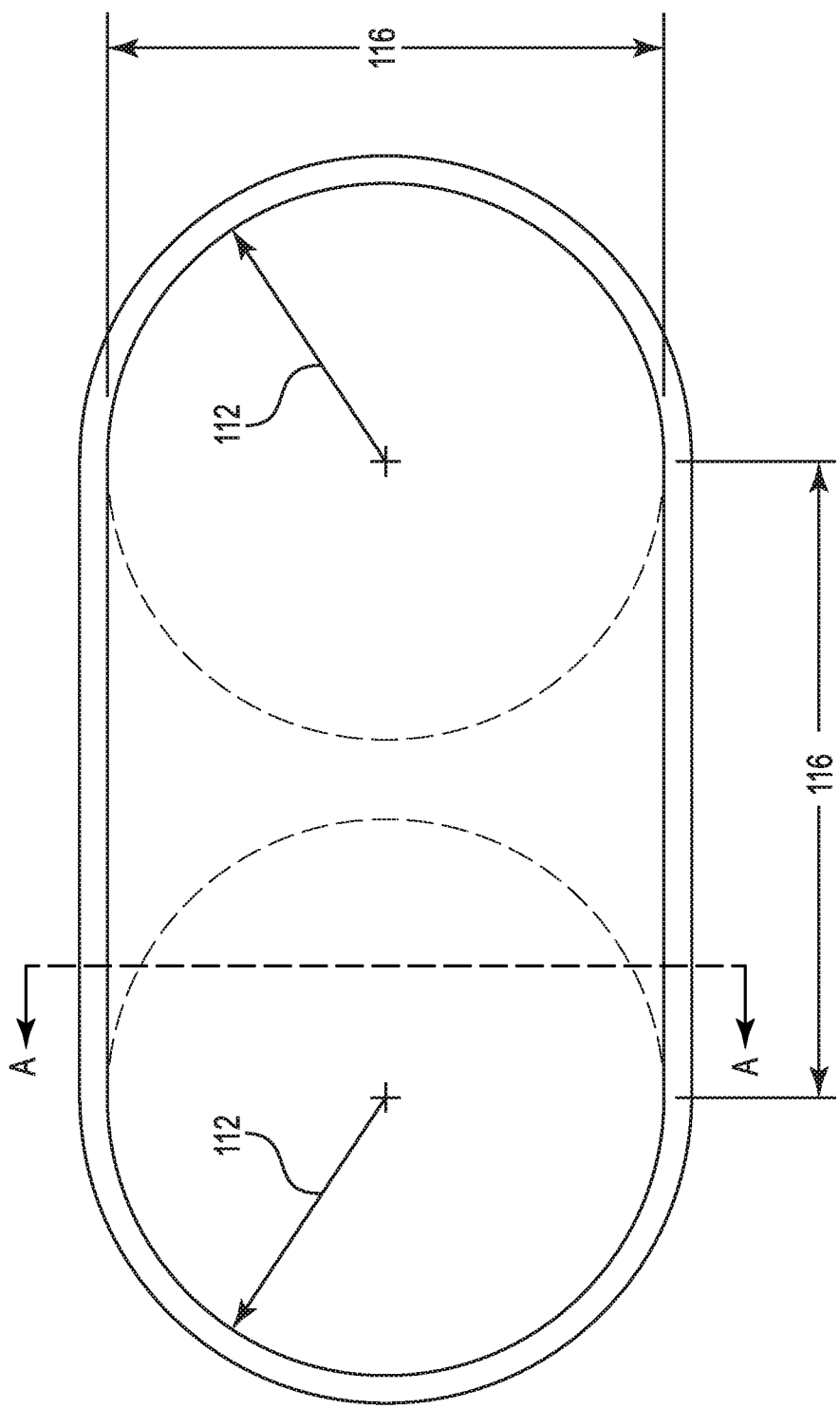
FIG. 2 is a top view of the embodiment shown in FIG. 1.

FIG. 2 is a top view of the embodiment shown in FIG. 1. Shown is the cutting surface with a radius (112) at each narrow side, a width (114) at that side, and a straight length (116) along the broad side.

Figure 3:
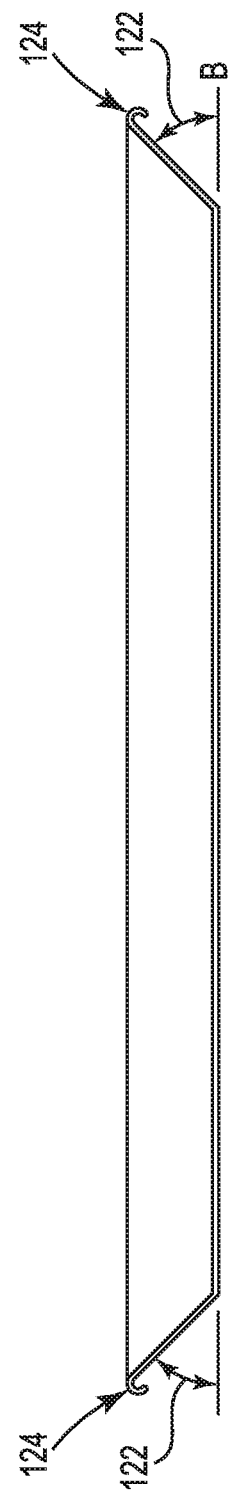
FIG. 3 is a side cutout view of the embodiment shown in FIG. 1.

FIG. 3 is a side cutout view of the embodiment shown in FIG. 1 at A-A. Shown is the plane B that encompasses cutting surface 110. Also seen is the angle 122 that the flange 120 sits away from cutting surface 110. Further shown is the rounded edge (124) of the flange along the straight portion of cutting surface 110.

Figure 4:
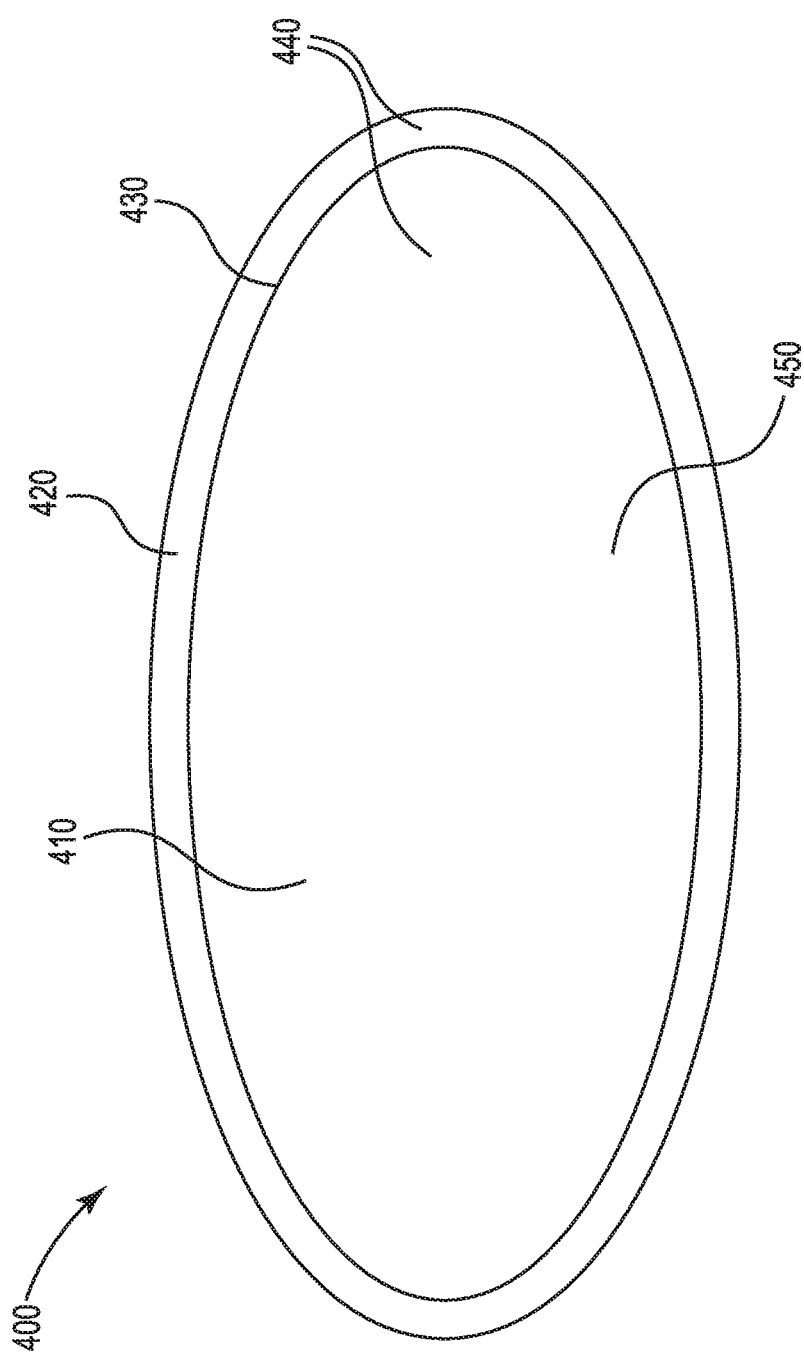
FIG. 4 is a top view of perspective view of an embodiment of the food preparation apparatus invention with a cutting surface having an oval shape.
Figure 5:
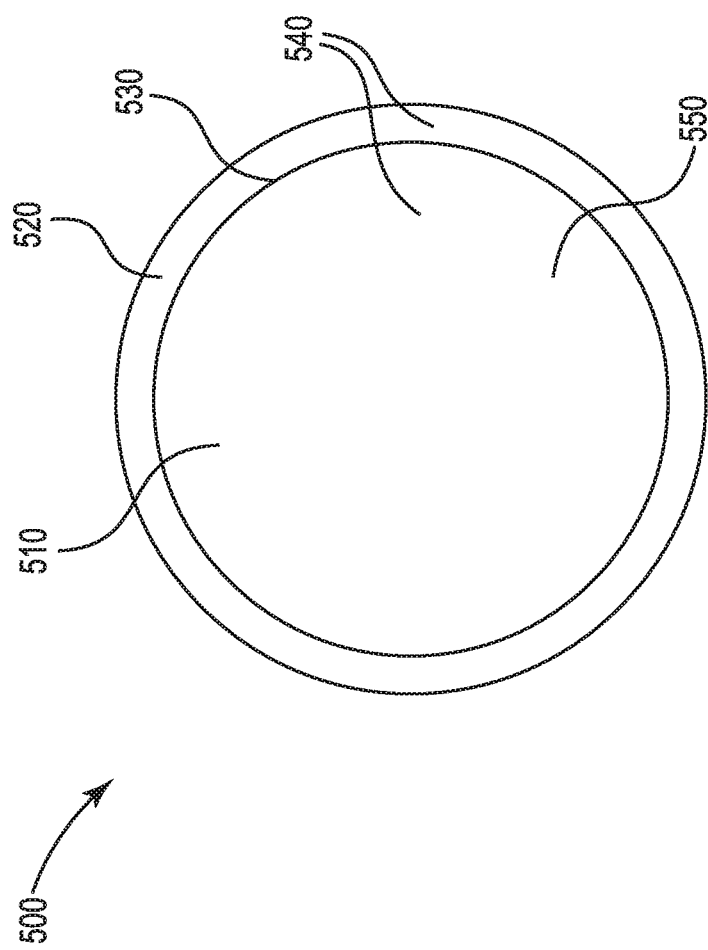
FIG. 5 is a top view of perspective view of an embodiment of the food preparation apparatus invention with a cutting surface having a circular shape.

FIG. 4 is a top view of perspective view of an embodiment of the food preparation apparatus invention with a cutting surface having an oval shape. A food preparation apparatus (400) is shown with a cutting board surface (410) shaped in an oval, a flexible flange (420) continuously affixed to the cutting surface 420 at the cutting surface edge (430). The material (440) of cutting surface 410 and flexible flange 420 allows for the apparatus to be bent into a funnel-like shape. The surface (450) is smooth with no right angles for collection of germs and bacteria FIG. 5 is a top view of perspective view of an embodiment of the food preparation apparatus invention with a cutting surface having a circular shape. A food preparation apparatus (500) is shown with a cutting board surface (510) shaped in an oval, a flexible flange (520) continuously affixed to the cutting board surface 520 at the cutting board surface edge (530). The material (540) of cutting surface 510 and flexible flange 520 allows for the apparatus to be bent into a funnel-like shape. The surface (550) is smooth with no right angles for collection of germs and bacteria FIG. 6 is a top view of perspective view of an embodiment of the food preparation apparatus invention with a cutting surface having a rectangular shape with rounded corners. A food preparation apparatus (600) is shown with a cutting board surface (610) shaped in an oval, a flexible flange (620) continuously affixed to the cutting board surface 620 at the cutting board surface edge (630). The material (640) of cutting surface 610 and flexible flange 620 allows for the apparatus to be bent into a funnel-like shape. The surface (650) is smooth with no right angles for collection of germs and bacteria The method of using the above described food preparation apparatus is also contemplated. A food preparation apparatus as described above is provided along with at least one piece of food to be prepared. The food is placed on the inner surface of the cutting surface of the food preparation apparatus. The food can then be cut into satisfactory form for subsequent use. The cut food can then be transferred to another apparatus such as, for example, a serving platter. Any liquid or solid waste debris resulting from the cutting can be directed into a disposal apparatus. Finally, the food preparation apparatus can be cleaned for reuse.

In one embodiment of the method, the method further comprises the step of cleaning the food preparation apparatus between using for preparing a different food if the food is a meat, a fruit, or a food group.

In one embodiment of the method, the method further comprises the step of cleaning the food preparation apparatus after using for preparing a series of different foods if the foods are vegetables.

In one embodiment of the method, the method comprises cleaning wherein the cleaning is with detergent and water or use of a dishwasher.

Other modifications and changes regarding my invention will be apparent to those skilled in the art. The invention is not considered limited to the embodiments chosen for purposes of disclosure and covers all changes and modifications that do not constitute departures from the true spirit and scope of this invention.

What is claimed is:

1. A method of using a food preparation apparatus comprises:
   providing a food preparation apparatus comprising:
   a planar cutting surface having a thickness, a hardness, a shape, an area, an inner surface, and a continuous edge having no sharp changes in direction, and is flat, and occupies a plane;
   a flexible flange having a thickness, an outer edge, an inner edge with a circumference smaller than the circumference of the outer edge, an inner surface, and a length and is continuously attached to the cutting surface edge in a manner that prevents that passage of liquid and solid debris,
   wherein the flexible flange extends outward and upward from the plane of the cutting surface at an angle that permits the apparatus to be folded inward upon itself to form a trough able to allow liquid to be channeled in one direction,
   providing at least one piece of food to be prepared;
   placing the food in the food preparation apparatus;
   cutting the food;
   transferring the cut food to another apparatus for further preparation or serving;
   pouring any liquid or solid waste debris into a disposal apparatus; and
   cleaning the food preparation apparatus for storage.

2. The method of using a food preparation apparatus of claim 1, further comprising cleaning the food preparation apparatus between using for preparing a different food if the food is a meat, a fruit, or a food group.

3. The method of using a food preparation apparatus of claim 1, further comprising cleaning the food preparation apparatus after using for preparing a series of different foods if the foods are vegetables.

4. The method of using a food preparation apparatus of claim 1, wherein the cleaning comprises use of detergent and water or use of a dishwasher.

5. The method of using the food preparation apparatus of claim 1, wherein the flange comprises a material that is configured to recover its shape when unfolded.

6. The method of using the food preparation apparatus of claim 1, wherein the material comprises polystyrene, polypropylene, low density polyethylene, high density polyethylene, or an acrylic-poly vinyl chloride alloy known as KYDEX thermoplastic.

7. The method of using the food preparation apparatus of claim 1, wherein the flexible flange and the cutting surface are made of a single piece of material.

8. The method of using the food preparation apparatus of claim 1, wherein angle is at least 35 degrees and not more than 55 degrees from the plane of the cutting surface.

9. The method of using the food preparation apparatus of claim 1, wherein the flange and the cutting surface are flexible plastic that is dishwasher safe.

10. The method of using the food preparation apparatus of claim 1, wherein flange length is at least 0.5 inch (1.3 cm) and not more than 4 inches (10 cm).

11. The method of using the food preparation apparatus of claim 1, wherein the flange is flexible enough to permit depression of a portion of the flange to be within the plane of the cutting surface when a handle of a cutting implement is pressed onto the flange to permit full access to the cutting surface, and wherein the flange is configured to return to its original position when stress is removed.

12. The method of using the food preparation apparatus of claim 1, wherein the thickness and hardness of the cutting surface prevents carving knives from penetrating the surface when cutting food but also permits at least slight bending of the cutting surface to enable funneling of debris contents on cutting surface.

13. The method of using the food preparation apparatus of claim 1, wherein the thickness of the flange allows the flange to remain above the horizontal plane of the cutting board when not pressed downward with a hand holding a carving knife.

14. The method of using the food preparation apparatus of claim 1, wherein the shape of the cutting surface is from a group consisting of circular, ellipsoid, oblong having semicircular end on the narrower sides or rectangular with rounded corners.

15. The method of using the food preparation apparatus of claim 1, wherein the shape of the cutting surface is oblong having semicircular end on the narrower sides and straight broader sides.

16. The method of using the food preparation apparatus of claim 1, wherein the outer edge of the flange affixed to the broader side of the cutting surface has an edge that is curved or beaded.

17. The method of using the food preparation apparatus of claim 1, wherein the area of the cutting surface is at least 28 square inches and no more than 325 square inches (180 and 2100 square centimeters).

* * * * *